(12) United States Patent
De Sousa

(10) Patent No.: US 9,735,721 B2
(45) Date of Patent: Aug. 15, 2017

(54) ROTARY DRIVE SYSTEM, METHOD FOR CONTROLLING AN INVERTER AND ASSOCIATED COMPUTER PROGRAM

(71) Applicant: Valeo Systemes de Controle Moteur, Cergy Pontoise (FR)

(72) Inventor: Luis De Sousa, Eragny sur Oise (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 0 days.

(21) Appl. No.: 14/577,034

(22) Filed: Dec. 19, 2014

(65) Prior Publication Data
US 2015/0180397 A1 Jun. 25, 2015

(30) Foreign Application Priority Data

Dec. 20, 2013 (FR) ...................................... 13 63249

(51) Int. Cl.
*H02P 1/18* (2006.01)
*H02P 3/08* (2006.01)
(Continued)

(52) U.S. Cl.
CPC ...... *H02P 23/0095* (2013.01); *B60L 15/2081* (2013.01); *H02P 23/28* (2016.02); *H02P 29/027* (2013.01); *H02P 29/68* (2016.02); *B60L 2260/22* (2013.01); *Y02T 10/645* (2013.01); *Y02T 10/7275* (2013.01)

(58) Field of Classification Search
CPC .......... H02K 3/28; H02K 17/12; H02K 11/33; H02K 1/2793; H02K 16/04; H02K 19/26; H02K 19/103; H02K 3/46; H02K 11/00; H02K 11/20; H02K 11/044; H02K 29/12; H02K 3/40; H02K 47/20; H02P 6/10;
(Continued)

(56) References Cited

U.S. PATENT DOCUMENTS 8,583,265 B1* 11/2013 Schulz ...................... H02P 6/10
318/400.14
2005/0001581 A1* 1/2005 Sakamoto ............... H02P 27/06
318/723
(Continued)

FOREIGN PATENT DOCUMENTS

JP H01-283084 A 11/1989
WO 2012-143643 A1 10/2012

OTHER PUBLICATIONS

Preliminary Search Report issued in corresponding French Patent Application No. 1363249 dated Oct. 20, 2014 (9 pages).

*Primary Examiner* — Marlon Fletcher
(74) *Attorney, Agent, or Firm* — Osha Liang LLP

(57) ABSTRACT

A rotary drive system having a voltage source and an electric motor. The motor has a stator with independent phases and a rotor, an inverter designed to connect each phase to the voltage source in order to generate phase currents, and a device for controlling the inverter. The control device includes a unit for determining whether the fundamental frequency of the phase currents is lower than a frequency threshold equal to, at the most, 100 Hz, and a unit for generating a command, configured such that, when the fundamental frequency is determine as being lower than the frequency threshold, the command causes the appearance of a homopolar component in the phase currents.

8 Claims, 3 Drawing Sheets

(51) Int. Cl.

| | | |
|---|---|---|
| *H02P 7/06* | (2006.01) | |
| *H02P 23/00* | (2016.01) | |
| *H02P 29/024* | (2016.01) | |
| *B60L 15/20* | (2006.01) | |
| *H02P 23/28* | (2016.01) | |
| *H02P 29/68* | (2016.01) | |

(58) Field of Classification Search
CPC .......... H02P 25/22; H02P 25/026; H02P 6/00; H02P 7/00; H02P 2201/09
See application file for complete search history.

(56) References Cited

U.S. PATENT DOCUMENTS

| | | | | |
|---|---|---|---|---|
| 2009/0058337 | A1* | 3/2009 | Kato | B60L 11/14 318/400.09 |
| 2010/0071970 | A1* | 3/2010 | Welchko | B60K 1/00 180/65.1 |
| 2010/0072928 | A1* | 3/2010 | Welchko | B60L 11/1803 318/400.13 |
| 2013/0155730 | A1* | 6/2013 | Reichard | H02M 5/453 363/37 |
| 2013/0307450 | A1* | 11/2013 | Fuller | B60L 3/0061 318/400.3 |
| 2014/0292238 | A1* | 10/2014 | Furukawa | B60L 3/003 318/400.02 |
| 2014/0306627 | A1* | 10/2014 | Bruyere | H02P 6/002 318/400.15 |
| 2015/0145451 | A1* | 5/2015 | Semura | H02P 6/10 318/400.23 |
| 2015/0180397 | A1* | 6/2015 | De Sousa | H02P 23/0095 318/253 |
| 2015/0229247 | A1* | 8/2015 | Nakai | H02P 29/0038 318/400.02 |

\* cited by examiner

ROTARY DRIVE SYSTEM, METHOD FOR CONTROLLING AN INVERTER AND ASSOCIATED COMPUTER PROGRAM

The present invention relates to a rotary drive system, a method for controlling an inverter and an associated computer program.

A known implementation is to use a rotary drive system of the type comprising:
- a voltage source,
- an electric motor comprising:
- a stator with independent phases,
- a rotor,
- an inverter designed to connect each phase to the voltage source in order to generate phase currents, and
- a device for controlling the inverter.

The inverter generally comprises switches for forming the phase currents, these switches using for example semiconductor technology.

In normal operation, the phase currents of the electric motor are generally alternating. Thus, each switch alternates first switching phases so as to create a phase current in the phase in question and second phases in which it remains open. During the first phases, the switch heats up, whereas the heat is evacuated during the second phases. When the rotor rotates at a speed which is not too slow, the frequency of alternation between the two phases is sufficient for the switch not to heat up too much because the electrical time constant is greater than the thermal time constant. Thus, the variations of phase current will generate variations in junction temperature whose peak value can be handled by the switch.

In contrast, when the rotor is stuck or it rotates at a very slow speed, then the phase currents are closer to DC currents, and the switch then remains in the first phase. In the worst case scenario, the phase current is equal to the peak current (maximum current). However, the higher the phase current the more intense is the heating. Furthermore, as the current increases at the same time as the torque, this problem is exacerbated when a high torque has to be supplied by the electric motor. This situation occurs for example when trying to hold a vehicle on a hill. The torque is then maximized, whereas the speed is zero or very low.

There already exist solutions to the aforementioned problem.

For example, it is possible to reduce the chopping frequency (and hence the switching frequency of the switch) in order to reduce the switching losses. Since the switch has lower losses, it can withstand the high current. This solution has the drawback of sometimes generating a high acoustic noise. Furthermore, the majority of the losses are losses by conduction, such that the gain is low.

Another solution is to reduce the peak current leading to a reduction in the torque, which could be after a certain time in order to protect the switches. The decrease in the torque could lead to a change of balance position. This new balance position with lower currents permits the maximum torque. This solution is however not acceptable, because it does not allow the torque and the position of the vehicle to be controlled.

It may thus be desirable to find another solution for limiting the heating processes within the inverter.

In order to solve, at least in part, the aforementioned problem, a rotary drive system of the aforementioned type is provided, characterized in that the control device comprises:

- a unit for determining whether the fundamental frequency of the phase currents is lower than a frequency threshold equal to, at the most, 100 Hz,
- a unit for generating a command, configured such that, when the fundamental frequency is determined as being lower than the frequency threshold, the command causes the appearance of a homopolar component in the phase currents.

Optionally, the homopolar component is a harmonic.

Also optionally, the homopolar component is a third harmonic.

Also optionally, the homopolar component has a peak value equal to a predetermined fraction of the peak value of the non-homopolar components of the phase currents.

Also optionally, the homopolar component has a peak value equal to $1-\sqrt{3}/2$ times the peak value of the non-homopolar components of the phase currents.

Also optionally, the control device furthermore comprises a unit for determining whether a torque setpoint is higher than a torque threshold equal to at least 100 N, and in which the unit for generating the command is configured such that the command causes the appearance of a homopolar current in the phases of the electric motor when the fundamental frequency is determined as being lower than the frequency threshold and when the torque setpoint is determined as being higher than the torque threshold.

The invention also provides a method for controlling an inverter designed to connect each phase of a stator of an electric motor to a source of DC voltage, the phases being independent, the method being characterized in that it comprises:

- the determination of whether the fundamental frequency of the phase currents is lower than a frequency threshold equal to, at the most, 100 Hz,
- the generation of a command which, when the fundamental frequency is determined as being lower than the frequency threshold, causes the appearance of a homopolar component in the phase currents.

A computer program is also provided comprising instructions which, when executed on a computer, lead to the implementation by the computer of the steps of a method according to the invention.

One exemplary embodiment of the invention will now be described with reference to the appended drawings, amongst which:

Figure 1:
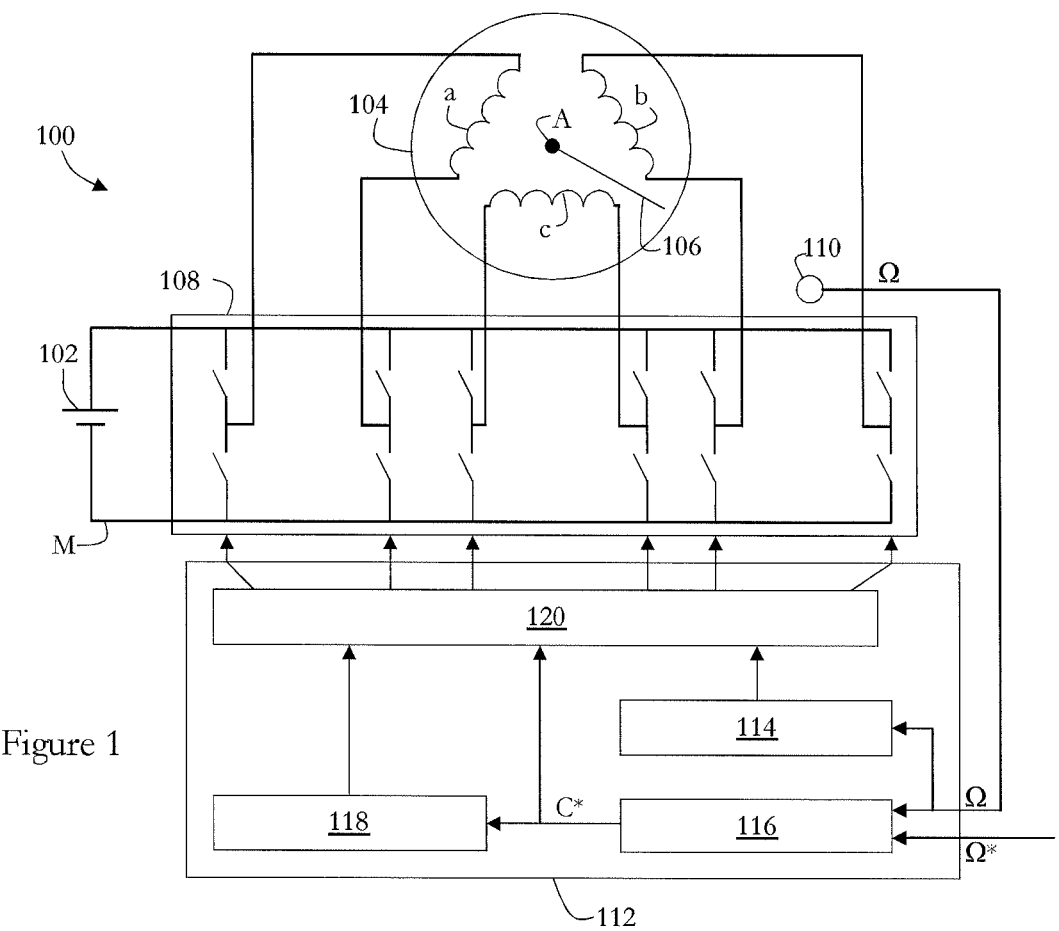
FIG. 1 is a diagram of a rotary drive system according to the invention.

With reference to FIG. 1, a rotary drive system 100 implementing the invention will now be described.

The rotary drive system 100 first of all comprises a voltage source 102 designed in the example described to supply a DC voltage V with respect to a reference electrical potential M (electrical ground).

The rotary drive system 100 furthermore comprises an electric motor 104. As is known per se, the electric motor 104 comprises a stator (not shown) and a rotor 106 designed to rotate with respect to the stator about an axis of rotation A, at a speed $\Omega$ and supplying an electromagnetic torque. The stator comprises phases, numbering three in the example described and denoted by the references a, b and c. The phases a, b, c each have two terminals. Furthermore, the phases a, b, c are independent, in other words they are not connected by one of their terminals to a common point, commonly referred to as "neutral". The phases a, b, c are designed to respectively conduct phase currents, denoted ia, ib and ic.

The rotary drive system 100 furthermore comprises an inverter 108 designed to connect each phase a, b, c of the electric motor 104 to the source of DC voltage 102. The inverter 108 comprises several arms, one per terminal for the phases a, b, c. Thus, in the example described, the inverter 108 comprises six arms. Each arm is designed to connect the terminal with which it is associated to the voltage V or else to the ground M of the voltage source 102. Each arm thus comprises two controlled switches configured in series and connected in their middle to the associated terminal, whereas the two ends of the arm are respectively connected to the voltage V and to the electrical ground M. The inverter 108 is thus designed to apply to each phase a, b, c: the voltage +V, its inverse −V, or else the zero voltage when the two terminals of the phase in question are both connected to the same point (V or M). The switches are for example bipolar transistors with insulated gates, also denoted by the acronym IGBT (for "Insulated Gate Bipolar Transistor").

The rotary drive system 100 furthermore comprises a sensor 110 designed to measure the speed of rotation Ω of the rotor 106 with respect to the stator.

The rotary drive system 100 furthermore comprises a device 112 for controlling the inverter 108. In the example described, the control device 112 is designed to supply a command to the inverter 108 as a function of the rotation speed Ω and of a rotation speed setpoint Ω* of the rotor 106 with respect to the stator. The speed setpoint Ω* is for example received from a speed regulator when the rotary drive system 100 is implemented in a motor vehicle. The control of the inverter 108 generally corresponds to very high frequency commands for opening/closing of the switches of the arms of the inverter 108. The control device 112 takes for example the form of a processor. In this case, the units of the control device 112 detailed hereinbelow are for example implemented in the form of computer programmes executed by the processor and/or dedicated electronic circuits of the processor.

The control device 112 first of all comprises a unit 114 for determining whether the fundamental frequency of the phase currents is lower than a frequency threshold equal to, at the most, 100 Hz, preferably a minimum of 50 Hz. In the example described, the fundamental frequency of the phase currents is determined from the speed of rotation Ω of the rotor 106. Indeed, in an electric motor, it often happens that the phases alternate several times about the axis A (the electric motor then comprises several poles) in order to obtain a de-multiplication factor between the electrical frequency and the mechanical frequency of rotation of the rotor 106. Thus, the fundamental frequency of the phase currents is equal to the frequency of rotation of the rotor 106 multiplied by the de-multiplication factor.

The control device 112 furthermore comprises a unit 116 for determining an electromagnetic torque setpoint C* for the electric motor 104 based on the speed Ω and on the speed setpoint Ω*.

The control device 112 furthermore comprises a unit 118 for determining whether the torque setpoint is higher than a torque threshold equal to at least 100 N, preferably at least 200 N.

The control device 112 furthermore comprises a unit 120 for generating the command for the inverter 108. This unit 120 is configured such that the command causes the appearance of a homopolar component of phase current in the phases a, b, c of the electric motor 104 when the fundamental frequency is determined as being lower than the frequency threshold and when the torque setpoint is determined as being higher than the torque threshold. In the example described, when the fundamental frequency is determined as being higher than the frequency threshold or when the torque setpoint is determined as being lower than torque threshold, the unit 120 is furthermore configured such that the command of the inverter 108 balances the phases a, b, c, in other words such that there is no homopolar component.

In the example described, the homopolar component is a third harmonic and has a peak value equal to a predetermined fraction of the peak value of the non-homopolar components of the phase currents, preferably 1-√3/2 times the peak value of the non-homopolar components.

It will be appreciated that, in the case of a complete blockage of the rotor, the fundamental frequency is zero. In this case, the homopolar component is therefore constant.

Figure 2:
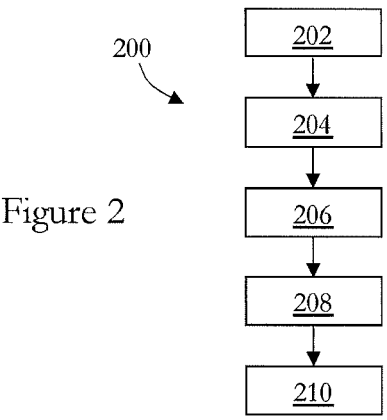
FIG. 2 is a block diagram of a method for controlling an inverter of the system in FIG. 1.

With reference to FIG. 2, a method 200 for controlling the inverter 108 will now be described.

During a step 202, the sensor 110 measures the speed and supplies this measurement to the control device 112.

During a step 204, the unit 114 deduces the fundamental frequency of the phase currents based on the speed and determines whether this fundamental frequency is lower than the frequency threshold.

During a step 206, the unit 116 determines the torque setpoint C* from the speed Ω and from the speed setpoint Ω*.

During a step 208, the unit 118 determines whether the torque setpoint C* is higher than torque threshold.

During a step 210, the unit 120 receives the torque setpoint C* together with the results of the determinations carried out by the units 114 and 118. If these results indicate that the fundamental frequency is lower than the frequency threshold and the torque setpoint higher than the torque threshold, the unit 120 generates a command for the switches of the inverter 108 causing the appearance of a homopolar component of phase current in the phases a, b, c. This homopolar component is added to the non-homopolar component which is accordingly designed to make the electric motor 104 reach the torque setpoint C*. Otherwise, the unit 120 generates a command balancing the phase currents, in such a manner that only the non-homopolar component remains in each phase a, b, c.

Figure 3:
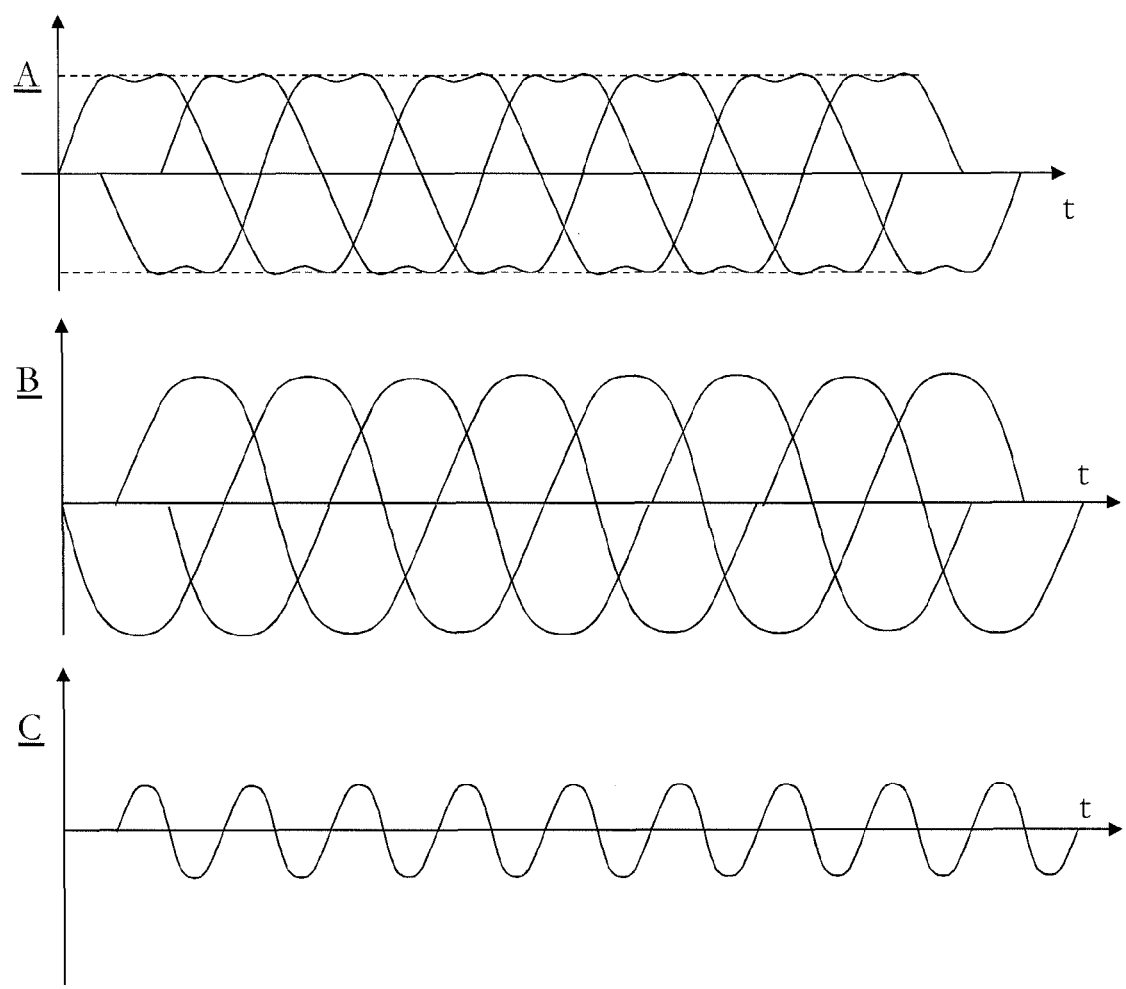
FIG. 3 shows graphs illustrating the components of the phase currents.

With reference to FIG. 3, the graph A shows the variation of the phase currents over time when a third harmonic homopolar component is present.

The graph B shows the non-harmonic components, whereas the graph C shows the homopolar component present in each phase a, b, c.

Figure 4:
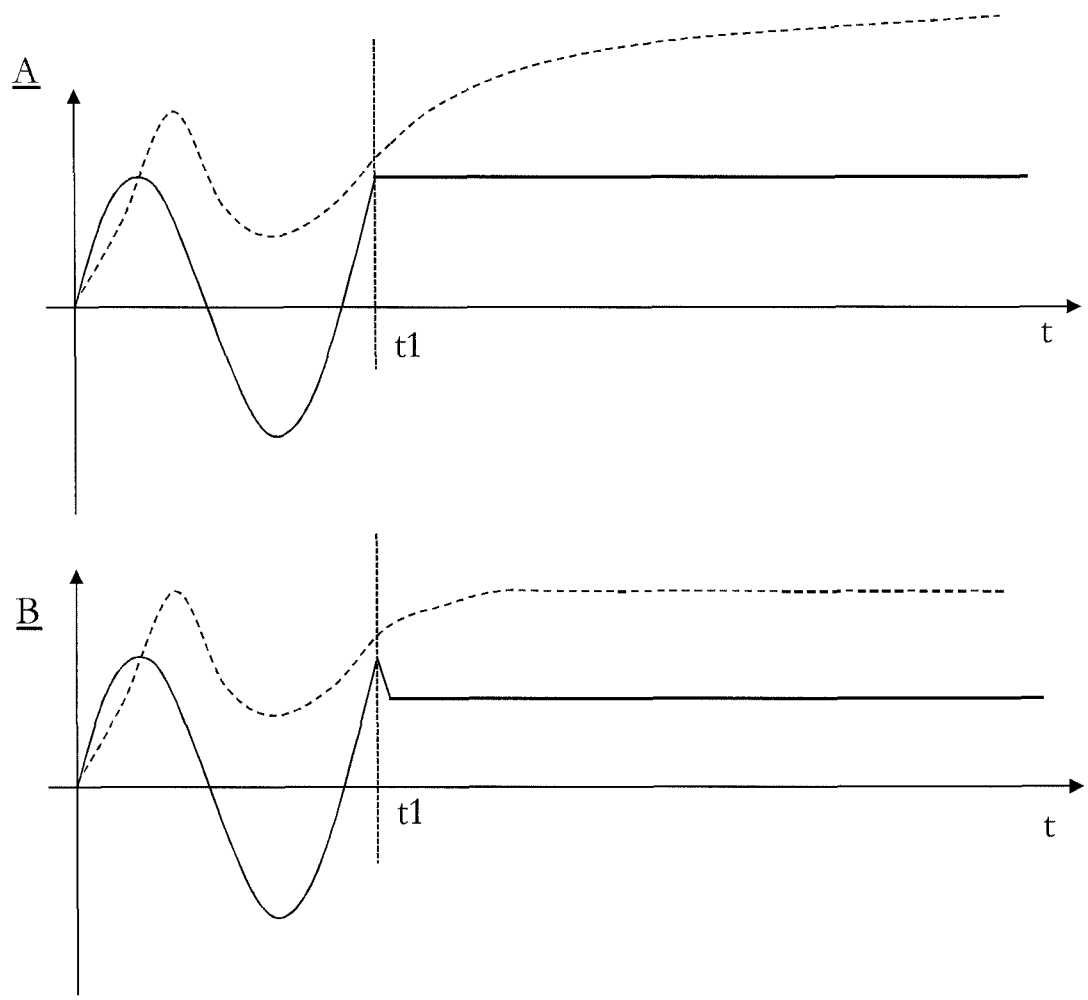
FIG. 4 shows graphs illustrating the effect of the addition of a homopolar component into the phase currents.

With reference to FIG. 4, the graph A shows a phase current (continuous line) over time, and the temperature (dashed line) of a switch whose closing makes a current go into this phase, in the case of the prior art. At the time t1, the rotor gets blocked. The result of this is that the current in the phase remains at a constant value. From this moment on, the switch whose temperature is shown continuously switches in order to maintain the current constant. In the absence of any homopolar component, this results in a significant heating up of this switch.

The graph B shows the same situation for the drive system 100 previously described. It will be appreciated that, subsequent to the blocking of the rotor, a homopolar component is generated, the latter making the phase current flowing through the phase in question decrease, and hence limiting the heating of the switch.

The invention is not limited to the exemplary embodiment previously described, but on the contrary defined by the appended claims, whose scope extends to all the modifications and alternative configurations that may be conceived based on the general knowledge of those skilled in the art.

For example, a homopolar component could be generated whenever the fundamental frequency of the homopolar currents goes below the frequency threshold, irrespective of the value of the torque setpoint.

The invention claimed is:

1. A rotary drive system comprising:
a voltage source;
an electric motor comprising:
    a stator with independent phases,
    a rotor,
    an inverter designed to connect each phase to the voltage source in order to generate phase currents, and
    a device for controlling the inverter,
wherein the control device comprises:
    a unit for determining whether the fundamental frequency of the phase currents is lower than a frequency threshold less than or equal to 100 Hz,
    a unit for generating a command, configured such that, when the fundamental frequency is determined as being lower than the frequency threshold, the command causes the appearance of a homopolar component in the phase currents.

2. The rotary drive system according to claim 1, wherein the homopolar component is a harmonic.

3. The rotary drive system according to claim 2, wherein the homopolar component is a third harmonic.

4. The rotary drive system according to claim 2, wherein the homopolar component has a peak value equal to a predetermined fraction of the peak value of the non-homopolar components of the phase currents.

5. Rotary drive system according to claim 4, wherein the homopolar component has a peak value equal to $1-\sqrt{3}/2$ times the peak value of the non-homopolar components of the phase currents.

6. The rotary drive system according to claim 1, wherein the control device furthermore comprises a unit for determining whether a torque setpoint is higher than a torque threshold equal to at least 100 N, and wherein the unit for generating the command is configured such that the command causes the appearance of a homopolar current in the phases of the electric motor when the fundamental frequency is determined as being lower than the frequency threshold and when the torque setpoint is determined as being higher than the torque threshold.

7. A method for controlling an inverter for connecting each phase of a stator of an electric motor to a DC voltage source, the phases being independent, the method comprising:
obtaining a speed of rotation of the electric motor;
determining whether the fundamental frequency of the phase currents is lower than a frequency threshold less than or equal to 100 Hz; and
generating a command which, when the fundamental frequency is determined as being lower than the frequency threshold, causes the appearance of a homopolar component in the phase currents.

8. A non-transitory computer readable medium storing a computer program comprising instructions which, when executed on a computer, lead to the computer performing a method, the method comprising:
obtaining a speed of rotation of the electric motor;
deter mining whether the fundamental frequency of the phase currents is lower than a frequency threshold less than or equal to 100 Hz; and
generating a command which, when the fundamental frequency is determined as being lower than the frequency threshold, causes the appearance of a homopolar component in the phase currents.

* * * * *